US011243436B2

United States Patent
Iwasaki et al.

(10) Patent No.: US 11,243,436 B2
(45) Date of Patent: Feb. 8, 2022

(54) LIQUID CRYSTAL DISPLAY DEVICE

(71) Applicant: FUJIFILM Corporation, Tokyo (JP)

(72) Inventors: Tatsuya Iwasaki, Kanagawa (JP); Yuki Nakamura, Kanagawa (JP); Masaaki Suzuki, Kanagawa (JP); Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 16/668,385

(22) Filed: Oct. 30, 2019

(65) Prior Publication Data

US 2020/0064673 A1 Feb. 27, 2020

Related U.S. Application Data

(63) Continuation of application No. PCT/JP2018/017842, filed on May 8, 2018.

(30) Foreign Application Priority Data

May 8, 2017 (JP) .............................. JP2017-092517
Feb. 14, 2018 (JP) .............................. JP2018-023824

(51) Int. Cl.
*G02F 1/13363* (2006.01)
*G02F 1/1335* (2006.01)
*G02F 1/1337* (2006.01)

(52) U.S. Cl.
CPC ........ *G02F 1/13363* (2013.01); *G02F 1/1337* (2013.01); *G02F 1/133514* (2013.01);
(Continued)

(58) Field of Classification Search
CPC ......... G02F 1/134363; G02F 1/133749; G02F 1/133514; G02F 1/133528; G02F 1/13363; G02F 1/133638
See application file for complete search history.

(56) References Cited

U.S. PATENT DOCUMENTS 6,285,430 B1 9/2001 Saito
2007/0076155 A1* 4/2007 Nakayama ............... C08B 3/00
349/118
(Continued)

FOREIGN PATENT DOCUMENTS

CN 1854852 A 11/2006
CN 101887216 A 11/2010
(Continued)

OTHER PUBLICATIONS

Office Action, issued by the Japanese Patent Office dated Nov. 10, 2020, in connection with Japanese Patent Application No. 2019-517649.
(Continued)

*Primary Examiner* — Mariam Qureshi
(74) *Attorney, Agent, or Firm* — Edwards Neils LLC; Jean C. Edwards, Esq.

(57) ABSTRACT

A liquid crystal display device in which light leak and a tint change when being seen from an oblique direction at the time of black display are suppressed. The liquid crystal display device includes: a liquid crystal cell and a pair of polarizing plates that are disposed such that the liquid crystal cell is interposed between the pair of polarizing plates, in which a tilt angle of the liquid crystal compound is 1.0° or less, respective color filters that are disposed on respective pixel regions of the liquid crystal cell are provided between the pair of polarizing plates, Rth of the respective color filters satisfy predetermined requirements, the polarizing plate that is disposed on the visible side among the pair of polarizing plates includes an optical compensation layer and a polarizer in this order from the liquid crystal cell side, and the optical compensation layer satisfies a predetermined requirement.

20 Claims, 1 Drawing Sheet

(52) U.S. Cl.
CPC .. *G02F 1/133528* (2013.01); *G02F 1/133633* (2021.01); *G02F 1/133634* (2013.01); *G02F 1/133638* (2021.01); *G02F 1/133749* (2021.01); *G02F 2202/28* (2013.01); *G02F 2413/01* (2013.01); *G02F 2413/02* (2013.01); *G02F 2413/06* (2013.01); *G02F 2413/13* (2013.01)

(56) References Cited

U.S. PATENT DOCUMENTS

| | | | |
|---|---|---|---|
| 2009/0096966 A1 | 4/2009 | Umemoto et al. | |
| 2009/0128743 A1* | 5/2009 | Akao | G02F 1/13363 349/75 |
| 2009/0168001 A1 | 7/2009 | Ichihashi | |
| 2010/0045909 A1* | 2/2010 | Shutou | G02B 5/3083 349/118 |
| 2010/0157195 A1* | 6/2010 | Miyatake | G02B 5/3016 349/62 |
| 2010/0295002 A1 | 11/2010 | Shimizu et al. | |
| 2010/0296037 A1* | 11/2010 | Sakai | G02F 1/133634 349/119 |
| 2011/0096274 A1* | 4/2011 | Shimizu | G02B 5/201 349/106 |
| 2012/0162582 A1 | 6/2012 | Woo | |
| 2012/0236234 A1* | 9/2012 | Ishiguro | G02B 5/22 349/96 |
| 2012/0281169 A1 | 11/2012 | Kim et al. | |
| 2015/0079380 A1 | 3/2015 | Muramatsu et al. | |
| 2015/0277006 A1 | 10/2015 | Takasago et al. | |
| 2017/0038638 A1 | 2/2017 | Park | |
| 2017/0242174 A1* | 8/2017 | Ito | C08L 33/02 |
| 2018/0095211 A1* | 4/2018 | Lee | G02B 5/3041 |
| 2018/0231844 A1 | 8/2018 | Sakai et al. | |

FOREIGN PATENT DOCUMENTS

| | | | |
|---|---|---|---|
| CN | 101943825 A | | 1/2011 |
| CN | 101950371 A | | 1/2011 |
| CN | 102566137 A | | 7/2012 |
| CN | 102768436 A | | 11/2012 |
| JP | 11-305217 A | | 11/1999 |
| JP | 2007-163894 A | | 6/2007 |
| JP | 2007-225912 A | | 9/2007 |
| JP | 2010-085504 A | | 4/2010 |
| JP | 2010-145719 A | | 7/2010 |
| JP | 2011-100028 A | | 5/2011 |
| JP | 2014-016642 A | | 1/2014 |
| JP | 2015-200861 A | | 11/2015 |
| JP | 2016004142 A | | 1/2016 |
| JP | 2016-053709 A | | 4/2016 |
| JP | 2016-106241 A | | 6/2016 |
| KR | 10-2008-0072958 A | | 8/2008 |
| KR | 10-2011-0025689 A | | 3/2011 |
| KR | 10-2014-0025057 A | | 3/2014 |
| KR | 10-2016-0105153 A | | 9/2016 |
| WO | 2010/001733 A1 | | 1/2010 |
| WO | 2017/022623 A1 | | 2/2017 |

OTHER PUBLICATIONS

Office Action, issued by the Japanese Patent Office dated Nov. 10, 2020, in connection with Japanese Patent Application No. 2019-517650.
Notice of Reasons for Refusal, issued by the Japanese Patent Office dated Jun. 8, 2021, in connection with Japanese Patent Application No. 2019-517649.
Decision of Refusal, issued by the Japanese Patent Office dated Jun. 8, 2021, in connection with Japanese Patent Application No. 2019-517650.
Office Action, issued by the Korean Intellectual Property Office dated Sep. 22, 2020, in connection with Korean Patent Application No. 10-2019-7032649.
Office Action, issued by the Korean Intellectual Property Office dated Sep. 22, 2020, in connection with Korean Patent Application No. 10-2019-7032650.
International Search Report issued in PCT/JP2018/017842 dated Aug. 14, 2018.
Written Opinion issued in PCT/JP2018/017842 dated Aug. 14, 2018.
International Preliminary Report on Patentability completed by WIPO dated Nov. 12, 2019 in connection with International Patent Application No. PCT/JP2018/017842.
Office Action, issued by the State Intellectual Property Office dated Sep. 1, 2021, in connection with Chinese Patent Application No. 201880029764.X.
Office Action, issued by the State Intellectual Property Office dated Sep. 2, 2021, in connection with Chinese Patent Application No. 201880030626.3.

\* cited by examiner

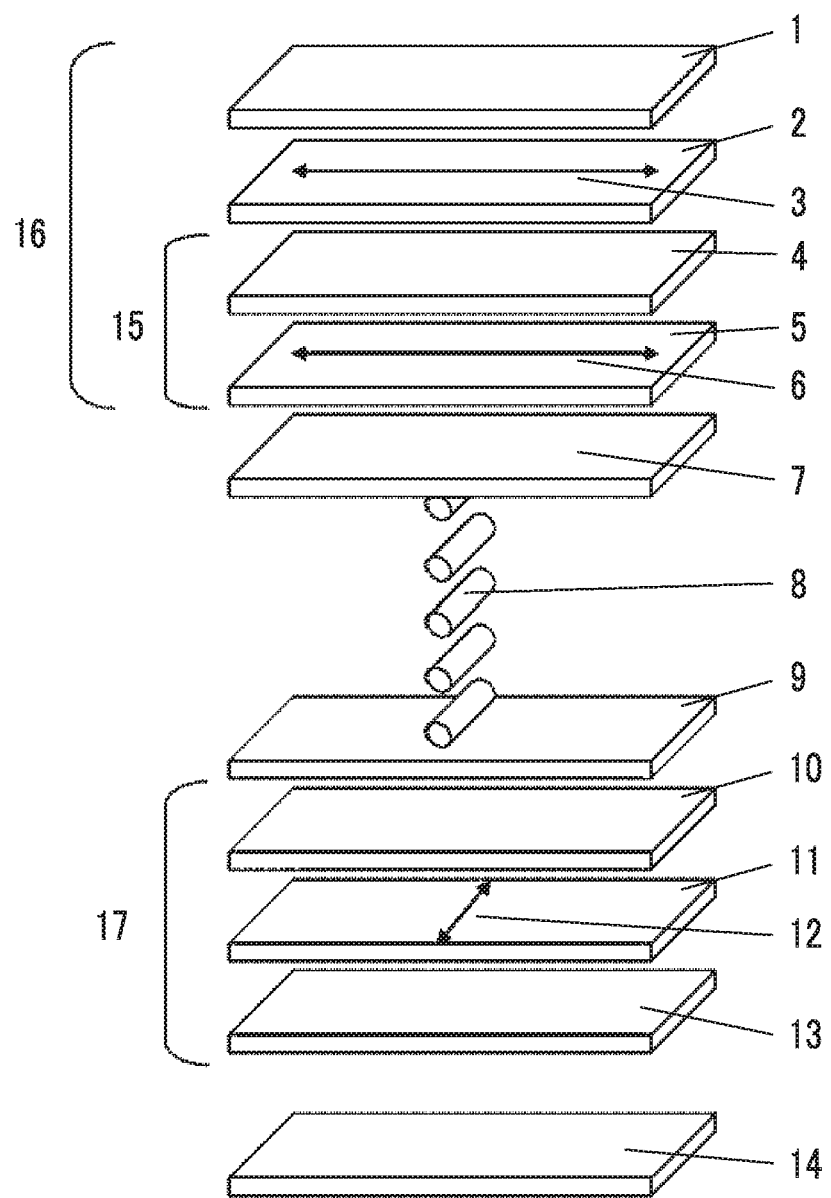

LIQUID CRYSTAL DISPLAY DEVICE

CROSS-REFERENCE TO RELATED APPLICATIONS

This application is a Continuation of PCT International Application No. PCT/JP2018/017842 filed on May 8, 2018, which was published under PCT Article 21(2) in Japanese, and which claims priority under 35 U.S.C. § 119(a) to Japanese Patent Application No. 2017-092517 filed on May 8, 2017 and Japanese Patent Application No. 2018-023824 filed on Feb. 14, 2018. The above applications are hereby expressly incorporated by reference, in their entirety, into the present application.

BACKGROUND OF THE INVENTION

1. Field of the Invention

The present invention relates to a liquid crystal display device.

2. Description of the Related Art

Unlike a twisted nematic (TN) mode or a vertical alignment (VA) mode in which a liquid crystal compound is driven by rising in a case where an electric field is applied between upper and lower substrates, an in-plane switching (IPS) mode or a fringe field switching (FFS) mode liquid crystal display device is a mode called a horizontal electric field mode in which a liquid crystal compound is allowed to respond in a substrate in-plane direction by an electric field including a component substantially parallel to a substrate surface.

In addition, the IPS mode or the FFS mode has a small limit on the viewing angle due to its structure in principle, and thus is known as a driving mode having characteristics such as a wide viewing angle and a small variation in chromaticity or tone change.

Regarding this horizontal electric field mode liquid crystal display device, JP2014-016642A discloses a configuration in which a polarizing plate, a liquid crystal layer, a color filter, and an optical compensation member are combined with each other in order to reduce a tint change in an oblique direction at the time of black display.

SUMMARY OF THE INVENTION

On the other hand, further improvement is required for light leak of black display and a tint change in a case where a liquid crystal display device is seen from an oblique direction.

The present inventor conducted an investigation on the liquid crystal display device described in JP2014-016642A and found that the characteristics are not sufficiently satisfied and further improvement is required.

The present invention has been made in consideration of the above-described circumstances, and an object thereof is to provide a liquid crystal display device in which light leak and a tint change in case of being seen from an oblique direction at the time of black display are suppressed.

The present inventors conducted a thorough investigation on the problems of the related art and thus found that the above-described object can be achieved with a liquid crystal display device having a predetermined structure.

That is, the present inventors found that the object can be achieved with the following configurations.

(1) A liquid crystal display device comprising at least:

a liquid crystal cell that includes a pair of substrates and a liquid crystal layer and in which an electric field including a component that is parallel to at least one of the substrates including an electrode is formed by the electrode, the pair of substrates being disposed to face each other, and the liquid crystal layer being disposed between the pair of substrates and including a liquid crystal compound with controlled alignment; and a pair of polarizing plates that are disposed such that the liquid crystal cell is interposed between the pair of polarizing plates, in which a tilt angle of the liquid crystal compound is 1.0° or less, the liquid crystal cell includes at least a first pixel region, a second pixel region, and a third pixel region, a first color filter that is disposed on the first pixel region of the liquid crystal cell, a second color filter that is disposed on the second pixel region of the liquid crystal cell, and a third color filter that is disposed on the third pixel region of the liquid crystal cell are disposed between the pair of polarizing plates on a visible side further than the liquid crystal cell, in a case where a wavelength representing a maximum transmittance of the first color filter is represented by $\lambda_1$, a wavelength representing a maximum transmittance of the second color filter is represented by $\lambda_2$, and a wavelength representing a maximum transmittance of the third color filter is represented by $\lambda_3$, a relationship of $\lambda_1 < \lambda_2 < \lambda_3$ is satisfied, a thickness-direction retardation Rth ($\lambda_1$) at the wavelength $\lambda_1$ of the first color filter, a thickness-direction retardation Rth ($\lambda_2$) at the wavelength $\lambda_2$ of the second color filter, and a thickness-direction retardation Rth ($\lambda_3$) at the wavelength $\lambda_3$ of the third color filter satisfy requirements of Expressions (1) to (3) described below, the polarizing plate that is disposed on the visible side among the pair of polarizing plates includes an optical compensation layer and a polarizer in this order from the liquid crystal cell side, an in-plane slow axis of the optical compensation layer and an absorption axis of the polarizer are parallel to each other, and an in-plane retardation Re (450) of the optical compensation layer at a wavelength of 450 nm and an in-plane retardation Re (550) of the optical compensation layer at a wavelength of 550 nm satisfy a requirement of Expression (4) described below.

(2) The liquid crystal display device according to (1), in which a requirement of Expression (5) described below is satisfied.

(3) The liquid crystal display device according to (1) or (2), in which a requirement of Expression (5-1) described below is satisfied.

(4) The liquid crystal display device according to any one of (1) to (3), in which the optical compensation layer includes a first optical compensation layer and a second optical compensation layer in this order from the liquid crystal cell side, an in-plane retardation Re1 (550) of the first optical compensation layer at a wavelength of 550 nm and a thickness-direction retardation Rth1 (550) of the first optical compensation layer at a wavelength of 550 nm satisfy requirements of Expressions (8) and (9) described below, and an in-plane retardation Re2 (550) of the second optical compensation layer at a wavelength of 550 nm and a thickness-direction retardation Rth2 (550) of the second optical compensation layer at a wavelength of 550 nm satisfy requirements of Expressions (10) and (11) described below.

(5) The liquid crystal display device according to (4),
in which the first optical compensation layer is a positive A plate, and
the second optical compensation layer is a positive C plate.

(6) The liquid crystal display device according to (5),
in which the first optical compensation layer is a λ/4 layer.

(7) The liquid crystal display device according to any one of (4) to (6),
in which a thickness-direction retardation Rth2 (450) of the second optical compensation layer at a wavelength of 450 nm and a thickness-direction retardation Rth2 (550) of the second optical compensation layer at a wavelength of 550 nm satisfy a requirement of Expression (12) described below.

(8) The liquid crystal display device according to any one of (4) to (7),
in which at least one of the first optical compensation layer or the second optical compensation layer is a film obtained by immobilizing a liquid crystal compound that is aligned.

(9) The liquid crystal display device according to (8),
in which the first optical compensation layer is a film obtained by immobilizing a rod-like liquid crystal compound that is aligned in a direction parallel to a substrate surface.

(10) The liquid crystal display device according to (8) or (9),
in which the second optical compensation layer is a film obtained by immobilizing a rod-like liquid crystal compound that is aligned in a direction perpendicular to a substrate surface.

(11) The liquid crystal display device according to any one of (1) to (3),
in which the optical compensation layer has a single-layer configuration, and
an in-plane retardation Re1 (550) of the optical compensation layer at a wavelength of 550 nm and a thickness-direction retardation Rth1 (550) of the optical compensation layer at a wavelength of 550 nm satisfy requirements of Expressions (6) and (7) described below.

(12) The liquid crystal display device according to any one of (1) to (11),
in which the optical compensation layer is bonded to the polarizer through a polyvinyl alcohol adhesive.

(13) The liquid crystal display device according to any one of (1) to (12),
in which the optical compensation layer is directly bonded to the polarizer through a curable adhesive composition that is cured by irradiation of an active energy ray or by heating.

(14) The liquid crystal display device according to any one of (1) to (13),
in which the polarizing plate that is disposed on a side opposite to the visible side among the pair of polarizing plates includes at least a protective film and a polarizer in this order from the liquid crystal cell side.

(15) The liquid crystal display device according to (14),
in which a thickness-direction retardation Rth3 (550) of the protective film at a wavelength of 550 nm satisfies a requirement of Expression (13) described below.

According to the present invention, it is possible to provide a liquid crystal display device in which light leak and a tint change in case of being seen from an oblique direction at the time of black display are suppressed.

BRIEF DESCRIPTION OF THE DRAWINGS

FIG. 1 is a schematic diagram illustrating one example of an embodiment of the present invention.

DESCRIPTION OF THE PREFERRED EMBODIMENTS

Hereinafter, the details of the present invention will be described.

The following description regarding components has been made based on a representative embodiment of the present invention. However, the present invention is not limited to the embodiment.

In this specification, numerical ranges represented by "to" include numerical values before and after "to" as lower limit values and upper limit values.

In addition, in this specification, a polarizing plate refers to a polarizer having at least one surface on which a protective layer or a functional layer is disposed, and a polarizer and a polarizing plate are distinguished from each other.

In addition, in this specification, "parallel" or "perpendicular" does not exactly represent "parallel" or "perpendicular" and represents a range of ±5° from "parallel" or "perpendicular".

In addition, in this specification, "(meth)acrylate" represents any one of acrylate or methacrylate, "(meth)acryl" represents any one of acryl or methacryl, and "(meth)acryloyl" denotes any one of acryloyl or methacryloyl.

In this specification, Re (λ) and Rth (λ) represent an in-plane retardation and a thickness-direction retardation at a wavelength λ, respectively. Unless specified otherwise, the wavelength λ refers to 550 nm.

In the present invention, Re (λ) and Rth (λ) are values measured at the wavelength λ using AxoScan OPMF-1 (manufactured by Opto Science Inc.). By inputting an average refractive index ((nx+ny+nz)/3)) and a thickness (d (μm) to AxoScan, the following expressions can be calculated.

In-Plane Slow Axis Direction)(°

$Re(\lambda)=R0(\lambda)$ $Rth(\lambda)=((nx+ny)/2-nz)\times d$

In addition, in the present invention, Nz is defined as Nz factor=Rth (550)/Re (550)+0.5 by an in-plane retardation Re (550) and a thickness-direction retardation Rth (550) of a phase difference layer at a wavelength of 550 nm.

In this present invention, the refractive indices nx, ny, and nz are measured using an Abbe refractometer (NAR-4T, manufactured by Atago Co., Ltd.), and a sodium lamp (λ=589 nm) is used as a light source.

In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley&Sons, Inc.) and catalogs of various optical films can also be used.

The values of average refractive index of major optical films are as follows: cellulose acylate (1.48), cycloolefin polymer (1.52), polycarbonate (1.59), polymethyl methacrylate (1.49), and polystyrene (1.59).

Hereinafter, an embodiment of the present invention will be described with reference to the drawings.

A liquid crystal display device illustrated in FIG. 1 includes: liquid crystal cells (7 to 9); an upper polarizing plate 16 (1 to 6) and a lower polarizing plate 17 (10 to 13) that are interposed such that the liquid crystal cell is interposed therebetween; and a backlight unit 14 that is provided on the outside further than the lower polarizing plate 17. The liquid crystal cell (7 to 9) includes a liquid crystal cell upper substrate 7, a liquid crystal cell lower substrate 9, and a liquid crystal layer 8 that is interposed between the liquid crystal cell upper substrate 7 and the liquid crystal cell lower substrate 9. The lower substrate 9 includes an electrode layer (not illustrated in FIG. 1) on a facing surface thereof, and the electrode layer is configured to provide an electric field parallel to the surface of the substrate 9 to the liquid crystal layer. The electrode layer is typically formed of transparent indium tin oxide (ITO). An alignment layer (not illustrated in FIG. 1) for controlling the alignment of the liquid crystal compound 8 is formed on the electrode layer of the substrate 9 and the facing surface of the substrate 7 to control an alignment direction of the liquid crystal compound 8. In order to maintain display symmetry, the alignment layer is preferably an ultraviolet (UV) alignment layer.

In FIG. 1, the liquid crystal cell is disposed between the upper polarizing plate 16 and the lower polarizing plate 17. The upper polarizing plate 16 includes a protective film 1, a polarizer 2, and an optical compensation layer 15 (4 and 5). The lower polarizing plate 17 includes a polarizer 11 and protective films 10 and 13 disposed on both surfaces of the polarizer 11.

The upper polarizing plate 16 and the lower polarizing plate 17 are disposed such that an absorption axis 3 of the polarizer 2 in the upper polarizing plate 16 and an absorption axis 12 of the polarizer 11 in the lower polarizing plate 17 are perpendicular to each other. In a case where the upper polarizing plate 16 is the polarizing plate on the visible side, it is preferable that the absorption axis 3 of the polarizer 2 in the upper polarizing plate 16 is laminated to be perpendicular to an extraordinary light refractive index direction of the liquid crystal compound 8 in the liquid crystal cell in a state where (OFF state) a voltage is not applied.

Although not illustrated in FIG. 1, on the liquid crystal cell upper substrate 7 (on the surface of the liquid crystal cell upper substrate 7 the visible side (upper polarizer side)), a blue color filter (hereinafter, also referred to as "BCF"), a green color filter (hereinafter, also referred to as "GCF"), and a red color filter (hereinafter, also referred to as "RCF") are disposed.

In addition, the liquid crystal cell includes three pixel regions where the BCF, the GCF, and the RCF are disposed, respectively.

The BCF, the GCF, and the RCF correspond the first color filter, the second color filter, and the third color filter in the liquid crystal display device according to the embodiment of the present invention, respectively. In addition, the three pixel regions in the liquid crystal cell correspond to the first pixel region, the second pixel region, and the third pixel region included in the liquid crystal cell in the liquid crystal display device according to the embodiment of the present invention, respectively.

FIG. 1 illustrates a case where light is incident from the backlight unit 14 that is disposed outside the lower polarizing plate 17. In a non-driving state (OFF state) where a drive voltage is not applied to the electrode (not illustrated in FIG. 1), the liquid crystal compound 8 in the liquid crystal layer is aligned to be substantially parallel to the surfaces of the liquid crystal cell upper substrate 7 and the liquid crystal cell lower substrate 9 such that the major axis thereof is substantially parallel to the absorption axis 12 of the polarizer 11. In this state, light that is allowed to enter a predetermined polarization state by the polarizer 11 does not receive the birefringence effect of the liquid crystal compound 8 so as to be absorbed by the absorption axis 3 of the polarizer 2. At this time, black display occurs. On the other hand, In a driving state (ON state) where a drive voltage is applied to the electrode (not illustrated in FIG. 1), an electric field including a component parallel to the substrate is formed, and the liquid crystal compound 8 is aligned such that the major axis thereof matches the direction of the electric field. As a result, the polarization state of light that is allowed to enter a predetermined polarization state by the polarizer 11 changes due to the birefringence effect of the liquid crystal compound 8 so as to pass through the polarizer 2. At this time, white display occurs.

In the liquid crystal display device according to the embodiment of the present invention, by controlling the thickness-direction retardation Rth of the BCF, the GCF, and the RCF per pixel region and adjusting the phase difference and the wavelength dispersibility of the optical compensation layer to be in a predetermined range, light leak and a tint change in case of being seen from an oblique direction at the time of black display are suppressed.

Hereinafter, each of the members included in the liquid crystal display device will be described in detail.

<Liquid Crystal Cell>

The liquid crystal cell in the liquid crystal display device illustrated in FIG. 1 includes: a pair of substrates at least one of which includes an electrode and a liquid crystal compound, the pair of substrates being disposed to face each other and the liquid crystal layer being disposed between the pair of substrates and including a liquid crystal compound with controlled alignment.

It is preferable that an alignment layer for aligning the liquid crystal compound is disposed on both facing surfaces inside the substrate (corresponding to the liquid crystal cell upper substrate and the liquid crystal cell lower substrate). In addition, in general, a columnar or a spherical spacer for maintaining the distance (cell gap) between the two substrates is disposed in the liquid crystal layer.

In addition, a reflection plate, a collecting lens, a brightness improving film, a light emitting layer, a fluorescent layer, a phosphor layer, an antireflection film, an antifouling film, and a hard coat film may be disposed in the liquid crystal cell.

As the substrate, a transparent glass substrate is preferable. As the liquid crystal cell substrate, a silicon glass substrate that is harder and endures high temperature or a plastic substrate may be used.

The kind of the liquid crystal compound constituting liquid crystal layer is not particularly limited. For example, as the liquid crystal compound, a nematic liquid crystal compound (for example, a nematic liquid crystal compound in which dielectric constant anisotropy $\Delta\varepsilon$ is positive. In a case where the value of the dielectric constant anisotropy $\Delta\varepsilon$ of the nematic liquid crystal compound is high, the drive voltage can be reduced. In a case where the refractive index anisotropy $\Delta n$ is low, the thickness (gap) of the liquid crystal layer can be increased, the sealing time of the liquid crystal compound can be reduced, and a variation in gap can be reduced.

The thickness (gap) of the liquid crystal layer is preferably more than 2.8 μm and less than 4.5 μm.

In a case where the retardation (Δn·d) of the liquid crystal layer is more than 0.25 μm and less than 0.40 μm, transmittance characteristics having substantially no wavelength dependence in a visible range can be more easily obtained.

In addition, in a case where the liquid crystal compound rotates horizontally from the original alignment direction by 45°, the maximum transmittance can be obtained.

The thickness (gap) of the liquid crystal layer can be typically controlled by polymer beads. In addition to the polymer heads, glass beads, fibers, or a columnar spacer formed of a resin may be used.

In general, in the IPS mode, unlike a vertical electric field mode such as a TN mode of the related art, it is known that interface tilt with respect to the substrate surface is not necessary in principle and, as the interface tilt angle decreases, the viewing angle characteristics are improved.

In the liquid crystal layer of the liquid crystal display device according to the embodiment of the present invention, the tilt angle of the liquid crystal compound is 1.0° or less. The lower limit value is not particularly limited and, for example, 0°. The tilt angle represents an angle between the major axis of the liquid crystal compound and the substrate surface.

In order to implement the tilt angle, as described above, for example, an aspect of using an alignment layer can be used. In a mass production technique of the related art, an alignment control layer formed of a polymer film such as polyimide is rubbed to impart liquid crystal alignment capability (initial alignment) such that an alignment layer is formed. On the other hand, cloth for rubbing is obtained by bundling fine fibers having a thickness of about 10 to 30 μm. Each of the fine fibers applies shearing force to a local portion of the alignment layer in a given direction such that the liquid crystal alignment capability is imparted. In the IPS mode, the electrode interval is 10 to 30 μm which is the same as the diameter of the fibers. Therefore, the vicinity of a step is not sufficiently rubbed, and the alignment is likely to be disordered. This alignment disorder causes deterioration in image quality such as a decrease in contrast ratio or non-uniformity in brightness or tint. As a method for solving the problem of the rubbing alignment treatment, a photoalignment method of irradiating a surface of a polymer film is irradiated with polarized ultraviolet light or the like such that a liquid crystal compound is aligned without a rubbing treatment is disclosed. For example, JP2005-351924A describes that the tilt angle of a liquid crystal compound is adjusted to be 1.0° or less using the photoalignment method. In the present invention, it is preferable to use the photoalignment method.

As described above, the liquid crystal cell includes the pixel regions on which the BCF, the GCF, and the RCF are disposed on the surfaces, respectively, and that correspond to the respective color filters. In other words, the liquid crystal cell includes a plurality of pixel regions, and the BCF, the GCF, and the RCF are disposed on the liquid crystal cells so as to correspond to the respective pixel regions.

Typically, in a liquid crystal display device that performs color display, one set of subpixels (pixel regions) of three primary colors (red, green, and blue) of light forms one pixel. In addition, subpixels of three or more colors may form one pixel.

<Color Filter>

In the liquid crystal display device illustrated in FIG. 1, the color filters that are disposed on the respective pixel regions of the liquid crystal cell are provided between the pair of polarizing plates. More specifically, the BCF, the GCF, and the RCF are disposed on the liquid crystal cell upper substrate in the liquid crystal cell. The BCF, the GCF, and the RCF are disposed on the visible side (the upper polarizing plate side).

The BCF is a color filter representing a maximum transmittance in a blue region (wavelength 420 to 490 nm), the GCF is a color filter representing a maximum transmittance in a green region (wavelength 495 to 570 nm), and the RCF is a color filter representing a maximum transmittance in a red region (wavelength 580 to 700 nm).

In this specification, "maximum transmittance" represents a maximum transmittance in a visible range (400 to 700 nm).

In a case where a wavelength representing a maximum transmittance of the BCF is represented by $\lambda_1$ (nm), a wavelength representing a maximum transmittance of the GCF is represented by $\lambda_2$ (nm), and a wavelength representing a maximum transmittance of the RCF is represented by $\lambda_3$ (nm), a relationship of $\lambda_1 < \lambda_2 < \lambda_3$ is satisfied In addition, a thickness-direction retardation Rth ($\lambda_1$) at the wavelength $\lambda_1$ of the BCF, a thickness-direction retardation Rth ($\lambda_2$) at the wavelength $\lambda_2$ of the GCF, and a thickness-direction retardation Rth ($\lambda_3$) at the wavelength $\lambda_3$ of the RCF satisfy requirements of Expressions (1) to (3).

$$Rth(\lambda_1) \leq Rth(\lambda_3) \qquad \text{Expression (1):}$$

$$Rth(\lambda_2) \leq Rth(\lambda_3) \qquad \text{Expression (2):}$$

$$Rth(\lambda_2) \leq 25 \text{ nm} \qquad \text{Expression (3):}$$

In particular, it is more preferable that a requirement of Expression (5) is satisfied, and it is more preferable that a requirement of Expression (5-1) is satisfied.

$$(Rth(\lambda_1) - 5 \text{ nm}) \leq Rth(\lambda_2) \qquad \text{Expression (5):}$$

$$Rth(\lambda_1) \leq Rth(\lambda_2) \qquad \text{Expression (5-1):}$$

In particular, it is preferable that a requirement of Expression (3-1) is satisfied, and it is more preferable that a requirement of Expression (3-2) is satisfied.

$$0 \text{ nm} \leq Rth(\lambda_2) \leq 20 \text{ nm} \qquad \text{Expression (3-1):}$$

$$0 \text{ nm} \leq Rth(\lambda_1) \leq 10 \text{ nm} \qquad \text{Expression (3-2):}$$

Rth ($\lambda_1$) is not particularly limited as long as it satisfies the requirement of Expression (1), and is preferably −20 to 20 nm and more preferably −10 to 10 nm.

Rth ($\lambda_3$) is not particularly limited as long as it satisfies the requirement of Expressions (1) and (2), and is preferably 0 to 35 nm and more preferably 10 to 25 nm.

A method for satisfying the requirements is not particularly limited. Examples of a method for satisfying Expressions (1) to (3) include a method of adjusting Rth of each of the color filters by changing the thickness of the color filter.

In addition, Rth of the color filter may be adjusted by adding a retardation increasing agent or a retardation decreasing agent to the color filter.

Examples of the retardation increasing agent include a compound represented by Formula (λ) and an equivalent compound thereof.

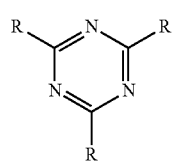

Formula (X)

-continued

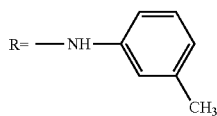

Examples of the retardation decreasing agent include a compound represented by Formula (XI).

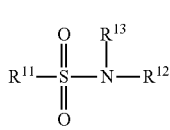

Formula (XI)

In Formula (XI), $R^{11}$ represents an alkyl group or an aryl group, and $R^{12}$ and $R^{13}$ each independently represent a hydrogen atom, an alkyl group, or an aryl group. In addition, the total number of carbon atoms in $R^{11}$, $R^{12}$, and $R^{13}$ is preferably 10 or more. $R^{11}$, $R^{12}$, and $R^{13}$ may have a substituent. As the substituent, a fluorine atom, an alkyl group, an aryl group, an alkoxy group, a sulfone group, or a sulfonamide group, is preferable, and an alkyl group, an aryl group, an alkoxy group, a sulfone group, or a sulfonamide group is more preferable.

In addition, the alkyl group may be linear, branched, or cyclic. The number of carbon atoms in the alkyl group is preferably 1 to 25, more preferably 6 to 25, and still more preferably 6 to 20. Examples of the alkyl group include a methyl group, an ethyl group, a propyl group, an isopropyl group, a butyl group, an isobutyl group, a t-butyl group, an amyl group, an isoamyl group, a t-amyl group, a hexyl group, a cyclohexyl group, a heptyl group, an octyl group, a bicyclooctyl group, a nonyl group, an adamantyl group, a decyl group, a t-octyl group. an undecyl group, a dodecyl group, a tridecyl group, a tetradecyl group, a pentadecyl group, a hexadecyl group, a heptadecyl group, an octadecyl group, a nonadecyl group, and a didecyl group.

The number of carbon atoms in the aryl group is preferably 6 to 30 and more preferably 6 to 24. As the aryl group, a phenyl group, a biphenyl group, a terphenyl group, a naphthyl group, a binaphthyl group, or a triphenyl phenyl group is preferable.

A method of preparing the color filter (BCF, GCF, RCF) is not particularly limited, and examples thereof include a color resist method of applying a photosensitive color resin composition using a spin coater or the like and then patterning the applied composition in a photolithography step and a laminating method. In a forming method such as the color resist method including an application step, color filters having different thicknesses can be formed by adjusting the application amount. In addition, in the laminating method, color filters having different thicknesses can be formed using transfer materials having different thicknesses.

Optionally, a black matrix may be disposed between the respective color filters. A method of preparing the black matrix is not particularly limited, and examples thereof include a well-known method.

In the above description, the BCF, the GCF, and the RCF included in the liquid crystal display device illustrated in FIG. 1 have been mainly described in detail. However, the present invention is not limited to this aspect. The BCF, the GCF, and the RCF may be color filters of other colors. That is, in the liquid crystal display device according to the embodiment of the present invention, the BCF, the GCF, and the RCF may be color filters of other colors as long as at least the first color filter, the second color filter, and the third color filter are provided on the respective pixel regions (the first pixel region to the third pixel region) of the liquid crystal cell and the thickness-direction retardation Rth ($\lambda_1$) at the wavelength $\lambda_1$ of the first color filter, the thickness-direction retardation Rth ($\lambda_2$) at the wavelength $\lambda_2$ of the second color filter, and the thickness-direction retardation Rth ($\lambda_3$) at the wavelength $\lambda_3$ of the third color filter satisfy the requirements of Expressions (1) to (3).

$Rth(\lambda_1) \leq Rth(\lambda_3)$  Expression (1):

$Rth(\lambda_2) \leq Rth(\lambda_3)$  Expression (2):

$Rth(\lambda_2) \leq 25$ nm  Expression (3):

<Polarizing Plate>

The liquid crystal display device illustrated in FIG. 1 includes a pair of polarizing plates.

The polarizing plate (upper polarizing plate) that is disposed on the visible side among the pair of polarizing plates includes an optical compensation layer and a polarizer in this order from the liquid crystal cell side. The absorption axis of the polarizer and the in-plane slow axis of the optical compensation layer are disposed to be parallel to each other.

In addition, as described above, the upper polarizing plate illustrated in FIG. 1 includes a protective film on a surface of the polarizer opposite to the optical compensation layer. Instead of the protective film, a curable resin layer may be disposed.

The polarizing plate (lower polarizing plate) that is disposed on a side opposite to the visible side among the pair of polarizing plates includes a polarizer and protective films disposed on both surfaces of the polarizer.

The protective film is an optional member and is not necessarily included in the liquid crystal display device.

Hereinafter, each of the members will be described in detail.

(Optical Compensation Layer)

The optical compensation layer has a single-layer configuration or a multi-layer configuration and has characteristics represented by Expression (4) described below. In particular, it is preferable that the optical compensation layer exhibits converse wavelength dispersibility (a characteristics in which the in-plane retardation increases as the measurement wavelength increases).

An in-plane retardation Re (450) of the optical compensation layer at a wavelength of 450 nm and an in-plane retardation Re (550) of the optical compensation layer at a wavelength of 550 nm satisfy a requirement of Expression (4).

$Re(450)/Re(550) < 0.95$  Expression (4):

In particular, it is preferable that a requirement of Expression (4-1) is satisfied.

$0.75 \leq Re(450)/Re(550) \leq 0.93$  Expression (4-1):

$0.80 \leq Re(450)/Re(550) \leq 0.90$  Expression (4-2):

As described above, the optical compensation layer may have a single-layer configuration or a multi-layer configuration. In the present invention, it is preferable that the optical compensation layer has a single-layer configuration or a two-layer configuration.

In the case of the single-layer structure, the optical compensation layer consists of only a first optical compensation layer. In the case of the two-layer configuration, the optical compensation layer consists of the first optical compensation layer and a second optical compensation layer. In either layer configuration, the optical compensation layer as a whole satisfies Expression (4), and the in-plane slow axis of the optical compensation layer is parallel to the absorption axis of the polarizer (the absorption axis of the optical compensation layer in the visible-side polarizing plate) disposed on the same side as that of the liquid crystal cell.

From the viewpoint of easy manufacturing, it is preferable that the optical compensation layer is a film that is formed using a polymer film or a liquid crystal composition.

As the polymer film, a cellulose acylate film, a cycloolefin polymer film (polymer film formed of a cycloolefin polymer), or an acrylic polymer film is preferable. It is preferable that the acrylic polymer film includes an acrylic polymer including at least one unit selected from the group consisting of a lactone ring unit, a maleic acid anhydride unit, and a glutaric acid anhydride unit.

From the viewpoint of reducing the thickness of the liquid crystal display device, the thickness of the polymer film is preferably as small as possible as long as optical characteristics, mechanical properties, and manufacturing suitability do not deteriorate and specifically is preferably 1 to 150 µm, more preferably 1 to 70 µm, and still more preferably 1 to 30 rim.

The film that is formed using a liquid crystal composition is a film that is formed using a composition including a liquid crystal compound and is preferably a film obtained by immobilizing the liquid crystal compound that is aligned. In particular, a film that is formed by applying a composition including a liquid crystal compound having a polymerizable group to form a coating film, aligning the liquid crystal compound in the coating film, and curing the coating film such that the alignment of the liquid crystal compound is immobilized.

Examples of the liquid crystal compound include a rod-like liquid crystal compound and a disk-like liquid crystal compound. In order to immobilize the aligned state, it is preferable that the liquid crystal compound has a polymerizable group.

Hereinafter, a specific aspect of the optical compensation layer will be described in detail.

(Case where Optical Compensation Layer has Single-Layer Configuration)

In a case where the optical compensation layer has a single-layer configuration, it is preferable that the optical compensation layer consists of only the first optical compensation layer and an in-plane retardation Re1 (550) of the optical compensation layer at a wavelength of 550 nm and a thickness-direction retardation Rth1 (550) of the optical compensation layer at a wavelength of 550 nm satisfy requirements of Expressions (6) and (7).

$$200\ \text{nm} \le Re1(550) \le 320\ \text{nm} \quad \text{Expression (6):}$$

$$-40\ \text{nm} \le Rth1(550) \le 40\ \text{nm}. \quad \text{Expression (7):}$$

The first optical compensation layer can be prepared by laminating a shrinkable film on a single surface or both surfaces of a polymer film and thermally stretching the laminate, for example, as described in JP2007-298960A.

The thickness of the first optical compensation layer is preferably 1 to 150 µm, more preferably 1 to 70 µm, and still more preferably 1 to 30 µm.

(Case where Optical Compensation Layer has Two-Layer Configuration)

In a case where the optical compensation layer has a two-layer configuration, it is preferable that the optical compensation layer consists of two layers including the first optical compensation layer (a biaxial film of nx>ny≥nz (a B-plate or a positive A plate)) and the second optical compensation layer (a [quasi-]uniaxial film of nx≈ny<nz (a positive [quasi-] C plate)). Specifically, it is preferable that an in-plane retardation Re1 (550) of the first optical compensation layer at a wavelength of 550 nm and a thickness-direction retardation Rth1 (550) of the first optical compensation layer at a wavelength of 550 nm satisfy requirements of Expressions (8) and (9), $$80\ \text{nm} \le Re1(550) \le 200\ \text{nm, and} \quad \text{Expression (8):}$$

$$20\ \text{nm} \le Rth1(550) \le 150\ \text{nm, and} \quad \text{Expression (9):}$$

an in-plane retardation Re1 (550) of the second optical compensation layer at a wavelength of 550 nm and a thickness-direction retardation Rth2 (550) of the second optical compensation layer at a wavelength of 550 nm satisfy requirements of Expressions (10) and (11), $$0\ \text{nm} \le Re2(550) \le 40\ \text{nm, and} \quad \text{Expression (10):}$$

$$-160\ \text{nm} \le Rth2(550) \le -40\ \text{nm}. \quad \text{Expression (11):}$$

In this aspect, the first optical compensation layer is disposed on the liquid crystal cell side, and the second optical compensation layer is disposed on the polarizer side.

It is more preferable that the first optical compensation layer satisfies the following expressions.

$$100\ \text{nm} \le Re1(550) \le 150\ \text{nm}$$

$$50\ \text{nm} \le Rth1(550) \le 120\ \text{nm}$$

The first optical compensation layer is obtained by stretching a polymer film (for example, a cellulose acylate film, a cyclic polyolefin film, or a polycarbonate film), which is formed using an appropriately method such as a melting film formation method or a solution film formation method, for example, with a machine-direction stretching method using a control of a peripheral speed of a roll, a cross-direction stretching method using a tenter, or a biaxial stretching method. The more details can be found in JP2005-338767A. In addition, a layer having a desired phase difference can also be formed by immobilizing the aligned state of the liquid crystal compound. That is, the first optical compensation layer is preferably a film obtained by immobilizing a state where a liquid crystal compound is aligned and more preferably a film obtained by immobilizing a state where a rod-like liquid crystal compound is aligned in a direction parallel to the substrate surface.

As the liquid crystal compound, a liquid crystal compound exhibiting reverse wavelength dispersibility is also preferably used. For example, a liquid crystal compound exhibiting reverse wavelength dispersibility described in WO2017/043438A can be used.

In a case where the optical compensation layer has a two-layer configuration, the thickness of the first optical compensation layer is preferably 1 to 80 µm, more preferably 1 to 40 µm, and still more preferably 1 to 25 µm.

In a case where the optical compensation layer has a two-layer configuration, it is preferable that the first optical compensation layer is a positive A plate.

A method of manufacturing the positive A plate can be found in, for example, JP2008-225281A and JP2008-026730A.

In this specification, the positive A plate is defined as follows. In a case where a refractive index in an in-plane slow axis direction of the film (direction in which a refractive index in a plane is maximum) is represented by nx, a refractive index in a direction perpendicular to the in-plane slow axis in a plane is represented by ny, a refractive index in a thickness direction is represented by nz, the positive A plate satisfies a relationship represented by Expression (A1). Rth of the positive A plate is a positive value.

$$nx > ny \approx nz \qquad \text{Expression (A1):}$$

"≈" described above represents not only a case where both elements are the same but also a case where both elements are substantially the same. Regarding the meaning of "substantially the same", "ny≈nz" includes a case where (ny−nz)×d (where d represents the thickness of the film) is −10 to 10 nm and preferably −5 nm to 5 nm.

In addition, due to the above-described definition, the positive A plate satisfies Nz=Rth (550)/Re(550)+0.5≈1.0.

It is preferable that the positive A plate is a λ/4 layer.

The λ/4 layer refers to a plate (phase difference film) in which an in-plane retardation Re (λ) at a specific wavelength λ nm satisfies Re (λ)≈λ/4.

This expression only has to be satisfied at any wavelength (for example, 550 nm) in a visible range. However, it is preferable that an in-plane retardation Re (550) at a wavelength of 550 nm satisfies a relationship of 110 nm≤Re (550)≤160 nm, and it is more preferable that an in-plane retardation Re (550) at a wavelength of 550 nm satisfies a relationship of 110 nm≤Re (550)≤150 nm.

It is more preferable that the second optical compensation layer satisfies the following expressions.

0 nm≤Re2(550)≤20 nm

−140 nm≤Rth2(550)≤−80 nm

A thickness-direction retardation Rth2 (450) of the second optical compensation layer at a wavelength of 450 nm and a thickness-direction retardation Rth2 (550) of the second optical compensation layer at a wavelength of 550 nm satisfy a requirement of Expression (12), $$Rth2(450)/Rth2(550) \leq 1.00. \qquad \text{Expression (12):}$$

Rth2 (450)/Rth2 (550) is more preferably lower than 0.95 and still more preferably 0.90 or lower. The lower limit is not particularly limited and is 0.75 or higher in many cases.

The second optical compensation layer can be obtained using a method including: forming a polymer film (for example, a cellulose acylate film, a cyclic polyolefin film, or a polycarbonate film) such that the film does not have in-plane retardation and stretching the film in a thickness (nz) direction using a heat-shrinkable film.

In addition, a layer having a desired phase difference can also be formed by immobilizing the aligned state of the liquid crystal compound. That is, the second optical compensation layer is preferably a film obtained by immobilizing a state where a liquid crystal compound is aligned and more preferably a film obtained by immobilizing a state where a rod-like liquid crystal compound is aligned in a direction perpendicular to the substrate surface.

As the liquid crystal compound, a liquid crystal compound exhibiting reverse wavelength dispersibility is also preferably used. For example, a liquid crystal compound exhibiting reverse wavelength dispersibility described in WO2017/043438A can be used.

The thickness of the second optical compensation layer is preferably 1 to 80 µm, more preferably 1 to 40 µm, and still more preferably 1 to 25 µm.

It is preferable that the second optical compensation layer is a positive C plate.

A method of manufacturing the positive C plate can be found in, for example, JP2017-187732A, JP2016-053709A, and JP2015-200861A.

In this specification, the positive C plate is defined as follows. In a case where a refractive index in an in-plane slow axis direction of the film (direction in which a refractive index in a plane is maximum) is represented by nx, a refractive index in a direction perpendicular to the in-plane slow axis in a plane is represented by ny, a refractive index in a thickness direction is represented by nz, the positive C plate satisfies a relationship represented by Expression (A2). Rth of the positive C plate is a negative value.

$$nx \approx ny < nz \qquad \text{Expression (A2):}$$

"≈" described above represents not only a case where both elements are the same but also a case where both elements are substantially the same. Regarding the meaning of "substantially the same", "nx≈ny" includes a case where (nx−ny)×d (where d represents the thickness of the film) is −10 to 10 nm and preferably −5 nm to 5 nm.

In addition, in the positive C plate, Re≈0 due to the above-described definition.

It is also preferable that the optical compensation layer has a configuration in which two films that are formed using a composition including a liquid crystal compound are laminated.

(Polarizer)

The kind of the polarizer is not particularly limited as long as it is a so-called linear polarizer having a function of converting natural light into specific linearly polarized light.

Examples of the polarizer include an absorbing polarizer, more specifically, an iodine polarizer, a dye polarizer using a dichroic dye, and a polyene polarizer.

The thickness of the polarizer is preferably 3 to 60 µm, more preferably 5 to 30 µm, and still more preferably 5 to 15 µm.

(Protective Film)

The protective film is not particularly limited, and examples thereof include a cellulose acylate film (for example, a cellulose triacetate film, a cellulose diacetate film, a cellulose acetate butyrate film, or a cellulose acetate propionate film), a polyacrylic resin film such as polymethyl methacrylate, a polyolefin film such as polyethylene or polypropylene, a polyester resin film such as polyethylene terephthalate or polyethylene naphthalate, a polyethersulfone film, a polyurethane resin film, a polyester film, a polycarbonate, a polysulfone film, a polyether film, a polymethylpentene film, a polyether ketone film, a (meth)acrylonitrile film, a cycloolefin polymer film (a norbornene resin (ARTON; trade name) manufactured by JSR Corporation), and an amorphous polyolefin (ZEONEX; trade name; manufactured by Zeon Corporation). Among these, a cellulose acylate film is preferable.

It is preferable that the optical characteristics of the protective film satisfy the following expressions.

0 nm≤Re3(550)≤10 nm

−40 nm≤Rth3(550)≤40 nm

In addition, in a case where the protective film is disposed between the polarizer and the liquid crystal cell as in the protective film 10 illustrated in FIG. 1, it is preferable that a protective film having a substantially isotropic refractive index is used. Specifically, it is more preferable that the protective film satisfies the following expression.

0 nm≤Re3(550)≤5 nm

−20 nm≤Rth3(550)≤10 nm

In addition, in a case where the polarizing plate that is disposed on a side opposite to the visible side among the pair of polarizing plates includes a protective film and a polarizer in this order from the liquid crystal cell side, it is preferable that a thickness-direction retardation Rth3 (550) of the protective film at a wavelength of 550 nm satisfies a requirement of Expression (13), $$Rth3(550) \leq 0 \text{ nm} \quad \text{Expression (13):}$$

In particular, it is more preferable that a requirement of Expression (13-1) is satisfied.

$$-10 \text{ nm} \leq Rth3(550) \leq 0 \text{ nm} \quad \text{Expression (13-1):}$$

In particular, recently, there has been a case where the liquid crystal cell lower substrate in the liquid crystal cell exhibits a predetermined Rth (for example, a case where Rth is more than 0 nm and 10 nm or less). In this case, it is preferable that a requirement of Expression (13) is satisfied.

In order to laminate the polarizer and the optical compensation layer and to laminate the polarizer and the protective film, an adhesive can be used. The thickness of the adhesive layer is preferably 0.01 to 30 μm, more preferably 0.01 to 10 μm, and still more preferably 0.05 to 5 μm.

As the adhesive, for example, an aqueous adhesive, that is, an adhesive in which an adhesive component is dissolved or dispersed in water can be used, and a polyvinyl alcohol adhesive is preferable. As the polyvinyl alcohol adhesive, an adhesive formed of a polyvinyl alcohol resin aqueous solution is preferable.

As the polyvinyl alcohol resin in the polyvinyl alcohol adhesive, for example, not only a vinyl alcohol homopolymer that is obtained by performing a saponification treatment on polyvinyl acetate as a homopolymer of vinyl acetate but also a vinyl alcohol copolymer that is obtained by performing a saponification treatment on a copolymer of vinyl acetate and another monomer that is copolymerizable with vinyl acetate and further a modified polyvinyl alcohol polymer that is obtained by partially modifying a hydroxyl group thereof can be used.

As a crosslinking agent, for example, a polyvalent aldehyde, a water-soluble epoxy compound, a melamine compound, a zirconia compound, a zinc compound, or glyoxylic acid may be added to the polyvinyl alcohol adhesive.

In a case where a polyvinyl alcohol adhesive is used, the thickness of the adhesive layer obtained from the polyvinyl alcohol adhesive is typically 1 μm.

Examples of the adhesive include a curable adhesive composition that is cured by irradiation of an active energy ray or by heating. More specifically, for example, a curable adhesive composition including a cationically polymerizable compound or a curable adhesive composition including a radically polymerizable compound that is cured by irradiation of an active energy ray or by heating can be used. Examples of the cationically polymerizable compound include a compound having an epoxy group or an oxetanyl group. The epoxy compound is not particularly limited as long as it includes at least two epoxy groups in the molecule, and examples thereof include a compound that is described in JP2004-245925A in detail.

The radically polymerizable compound is not particularly limited as long as it is a radically polymerizable compound having an unsaturated double bond such as a (meth)acryloyl group or a vinyl group, and examples thereof include a monofunctional radically polymerizable compound, a polyfunctional radically polymerizable compound having two or more polymerizable groups in a molecule, a (meth) acrylate having a hydroxyl group, acrylamide, and acryloylmorpholine. Among these compounds, one kind may be used alone, two or more kinds may be used in combination. For example, a compound that is described in JP2015-011094A in detail can be used. In addition, a radically polymerizable compound and a cationically polymerizable compound may also be used in combination.

In a case where the curable adhesive composition is used, a film is laminated using a laminating roll and is optionally dried and irradiated with an active energy ray or heated to cure the curable adhesive composition. A light source of the active energy ray is not particularly limited, and an active energy ray having an emission distribution of a wavelength of 400 nm or shorter is preferable. Specifically, a low-pressure mercury lamp, a middle-pressure mercury lamp, a high-pressure mercury lamp, an ultra-high pressure mercury lamp, a chemical lamp, a black light lamp, a microwave excitation mercury lamp, or a metal halide lamp is more preferable.

In addition, in a case where the polarizer and the optical compensation layer or the protective film are laminated through an adhesive, in order to improve the adhesion strength and to improve the wettability of the adhesive, a surface treatment (for example, a glow discharge treatment, a corona discharge treatment, or an UV treatment) may be performed on a surface of the optical compensation layer or the protective film opposite to the polarizer, or an easily adhesive layer may be formed thereon.

The easily adhesive layer and a manufacturing method thereof can be found in JP2007-127893A.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

<Preparation of IPS Mode Liquid Crystal Cell>

First, an IPS mode liquid crystal cell in which a liquid crystal layer was provided between two glass substrates and the interval (gap: d) between the substrates was about 4.0 μm was prepared. In the liquid crystal compound in the liquid crystal layer, Δn was 0.08625, and the value of Δn·d is shown in Table 1. In order to form the liquid crystal cell, a photo-alignment treatment was performed on the glass substrates with reference to Example 11 disclosed in JP2005-351924A to form an alignment layer, and a liquid crystal compound in the liquid crystal cell was aligned. The tilt angle of the liquid crystal compound with respect to the substrate surface is 0.1°. A blue color filter, a green color filter, and a red color filter having different values of Rth were formed on the visible-side substrate of the liquid crystal cell. This way, liquid crystal cells 1 to 7 shown in Table 1 were formed. In a case where a wavelength representing a maximum transmittance of the blue color filter is represented by a wavelength representing a maximum transmittance of the green color filter is represented by $\lambda_2$, and a wavelength representing a maximum transmittance of the red color filter is represented by $\lambda_3$, each wavelength in each of the liquid crystal cells satisfies a relationship of $\lambda_1 < \lambda_2 < \lambda_3$. In addition, the values of Rth at the respective wavelengths of the respective color filters provided on the formed liquid crystal cell are collectively shown in Table 1.

The value of Rth of each of the color filter was adjusted by adjusting the thicknesses of the color filters or by adding a retardation increasing agent (for example, the compound represented by Formula (X)) or retardation decreasing agent (for example, the compound represented by Formula (XI) to a material for forming the color filter layer, or by adjusting the addition amount thereof.

Regarding liquid crystal cells 1 to 6, Rth (550) of a rear substrate (liquid crystal cell lower substrate) was 0 nm.

In addition, regarding a liquid crystal cell 7, first, a liquid crystal cell of iMac (manufactured by Apple Inc.) was disassembled to obtain a rear substrate. In a case where a phase difference of the rear substrate was measured, Re (550)=0 nm and Rth (550)=6 nm. The liquid crystal cell 7 was prepared using this rear substrate and a substrate on a side (visible side) where the color filters are disposed.

TABLE 1

|  | Color Filter | | | | | |
|---|---|---|---|---|---|---|
|  | Rth (550) of Rear Substrate | Rth ($\lambda_1$) (nm) | Rth ($\lambda_2$) (nm) | Rth ($\lambda_3$) (nm) | Tilt Angle (°) | $\Delta$nd |
| Liquid Crystal Cell 1 | 0 | 0 | 7 | 25 | 0.1 | 345 |
| Liquid Crystal Cell 2 | 0 | 0 | 0 | 0 | 0.1 | 320 |
| Liquid Crystal Cell 3 | 0 | 7 | 0 | 15 | 0.1 | 350 |
| Liquid Crystal Cell 4 | 0 | 0 | 0 | 10 | 0.1 | 355 |
| Liquid Crystal Cell 5 | 0 | 3 | 0 | 10 | 0.1 | 360 |
| Liquid Crystal Cell 6 | 0 | 17 | 7 | 0 | 0.1 | 330 |
| Liquid Crystal Cell 7 | 6 | 0 | 0 | 10 | 0.1 | 355 |

Example 1

(Preparation of Protective film 1)

The following composition was put into a mixing tank and were stirred with each other to prepare a core layer cellulose acylate dope 1.

Core Layer Cellulose Acylate Dope 1

Cellulose acetate having an acetyl substitution degree of 2.88: 100 parts by mass The following ester oligomer A: 10 parts by mass The following polarizer durability improver: 4 parts by mass The following ultraviolet absorber: 2 parts by mass Methylene chloride (first solvent): 430 parts by mass Methanol (second solvent): 64 parts by mass Ester Oligomer a (Molecular Weight: 750)

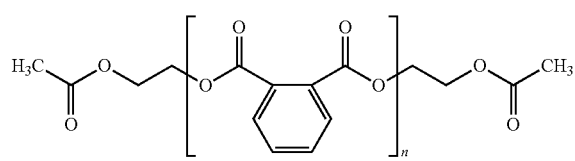

The Following Polarizer Durability Improver

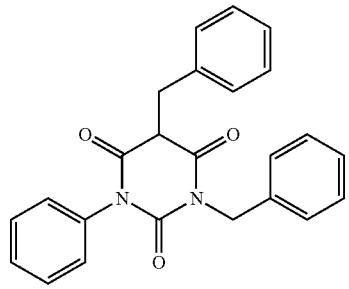 [SMILES: O=C1C(Cc2ccccc2)C(=O)N(c2ccccc2)C(=O)N1Cc1ccccc1]

Ultraviolet Absorber

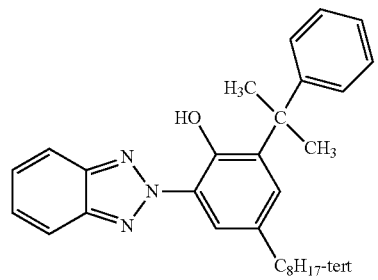

10 parts by mass of the following matting agent solvent was added to 90 parts by mass of the above-described core layer cellulose acylate dope 1 to prepare an outer layer core layer cellulose acylate dope 1.

Outer Layer Core Layer Cellulose Acylate Dope 1

Silica particles having an average particle size of 20 nm (AEROSIL R972, manufactured by Nippon Aerosil Co., Ltd.): 2 parts by mass Methylene chloride (first solvent): 76 parts by mass Methanol (second solvent): 11 parts by mass Core layer cellulose acylate dope 1: 1 part by mass The core layer cellulose acylate dope 1 and the outer layer core layer cellulose acylate dope 1 on the both sides were simultaneously cast on a drum at 20° C. from casting nozzles such that the outer layer cellulose acylate solutions are disposed on opposite sides of the core layer cellulose acylate solution. The obtained film was removed in a state where the solvent content was about 20 mass %, opposite ends of the film in the width direction were fixed using a tenter clip, and the film was horizontally stretched to 1.1 times and dried in a state where the residual solvent content was 3 to 15%. Next, the obtained film was transported to a gap between rolls of a heat treatment device to be further dried. As a result, a cellulose acylate film 1 having a thickness of 40 μm was prepared as a protective film 1. In a case where a phase difference of the protective film 1 was measured, Re (550)=2 nm and Rth (550)=7 nm.

(Preparation of Protective Film 2)

The following composition was put into a mixing tank and were stirred with each other to prepare a core layer cellulose acylate dope 2.

Core Layer Cellulose Acylate Dope 2

Cellulose acetate having an acetyl substitution degree of 2.88: 100 parts by mass The following polyester: 12 parts by mass The above-described polarizer durability improver: 4 parts by mass Methylene chloride (first solvent): 430 parts by mass Methanol (second solvent): 64 parts by mass Polyester (Number-Average Molecular Weight: 800)

10 parts by mass of the following matting agent solvent was added to 90 parts by mass of the above-described core layer cellulose acylate dope 2 to prepare an outer layer core layer cellulose acylate dope 2.

Matting Agent Solvent

Silica particles having an average particle size of 20 nm (AEROSIL R972, manufactured by Nippon Aerosil Co., Ltd.): 2 parts by mass Methylene chloride (first solvent): 76 parts by mass Methanol (second solvent): 11 parts by mass Core layer cellulose acylate dope: 1 part by mass The above-described core layer cellulose acylate dope 2 and the above-described outer layer core layer cellulose acylate dope 2 were filtered through filter paper having an average pore size of 34 μm and a sintered metallic filter having an average pore size of 10 μm, respectively. Next, the core layer cellulose acylate dope 2 and the outer layer core layer cellulose acylate dope 2 on the both sides were simultaneously cast on a drum at 20° C. from casting nozzles such that the outer layer cellulose acylate solutions are disposed on opposite sides of the core layer cellulose acylate solution (band casting machine).

Next, the obtained film was removed in a state where the solvent content was about 20 mass %, opposite ends of the film in the width direction were fixed using a tenter clip, and the film was horizontally stretched to a stretching ratio of 1.1 times and dried.

Next, the obtained film was transported to a gap between rolls of a heat treatment device to be further dried. As a result, a cellulose acylate film 2 having a thickness of 40 μm was prepared as a protective film 2. In a case where a phase difference of the protective film 2 was measured, Re (550)=1 nm and Rth (550)=−5 nm.

(Preparation of Protective film 3)

A cellulose acylate film 3 having a thickness of 20 μm was prepared as a protective film 3 using the same method as described above, except that the thickness of the cast film of the cellulose acylate film 2 was changed. In a case where a phase difference of the protective film 3 was measured, Re=1 nm and Rth=−2 nm.

(Preparation of Protective film 4)

[Preparation of Polymethyl Methacrylate (PMMA) Dope]

The following dope composition was put into a mixing tank and were stirred with each other to prepare a PMMA dope.

PMMA Dope

PMMA Resin: 100 parts by mass

SUMILIZER GS (manufactured by Sumitomo Chemical Co., Ltd.): 0.1 parts by mass

Dichloromethane: 426 parts by mass

Methanol: 64 parts by mass

[Preparation of PMMA Film]

The above-described PMMA dope was uniformly cast from a casting die onto a stainless steel band (casting support) (band casting machine). When the residual solvent content in the obtained cast film was 20 mass %, the cast film was released from the casting support, opposite ends of the obtained film in the width direction were fixed using a tenter clip, and the film was horizontally stretched to a stretching ratio of 1.1 times and dried. Next, the obtained film was transported to a gap between rolls of a heat treatment device to be further dried. As a result, a PMMA film having a thickness of 40 μm was prepared as a protective film 4. In a case where a phase difference of the protective film 4 was measured, Re (550)=0 nm and Rth (550)=−2 nm.

(Saponification Treatment of Protective Film)

The protective films 1 and 2 were dipped in 2.3 mol/L of sodium hydroxide aqueous solution at 55° C. for 3 minutes. The dipped protective films 1 and 2 were cleaned in a water cleaning bath at room temperature and were further neutralized using 0.05 mol/L of sulfuric acid at 30° C. Further, the obtained protective films 1 and 2 were cleaned in a water cleaning bath at room temperature and were dried with warm air at 100° C. to perform a saponification treatment on surfaces of the protective films 1 and 2.

(Preparation of Optical Compensation Layer)

A photo-alignment film-forming coating solution 1 was prepared with reference to the description of Example 3 of JP2012-155308A.

A liquid crystal layer-forming composition 1 having the following composition was prepared.

Liquid Crystal Layer-Forming Composition 1

Liquid crystal compound R2: 42.00 parts by mass

Liquid crystal compound R3: 42.00 parts by mass

Polymerizable compound B2: 16.00 parts by mass

Polymerization initiator P3: 0.50 parts by mass

Surfactant S3: 0.15 parts by mass

HISOLVE MTEM (manufactured by Toho Chemical Industry Co., Ltd.): 2.00 parts by mass NK ESTER A-200 (manufactured by Shin-Nakamura Chemical Co., Ltd.): 1.00 part by mass Methyl ethyl ketone: 424.8 parts by mass Liquid Crystal Compound R2

Liquid Crystal Compound R3

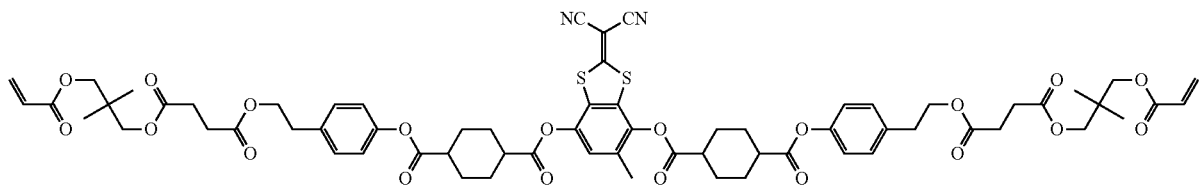 [SMILES: C=CC(=O)OCC(C)(C)COC(=O)CCC(=O)OCCc1ccc(OC(=O)C2CCC(C(=O)Oc3cc(C)c(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

Polymerizable Compound B2

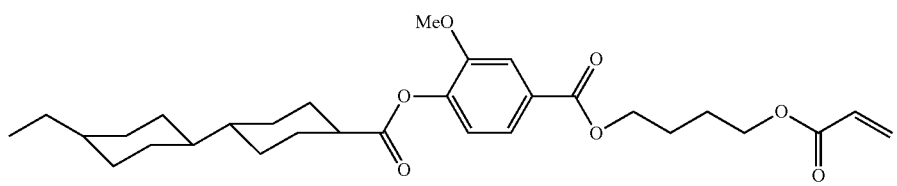 [SMILES: C=CC(=O)OCCCCOC(=O)c1ccc(OC(=O)C2CCC(C3CCC(CC)CC3)CC2)c(OC)c1]

Polymerization Initiator P3

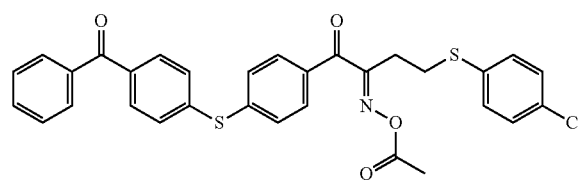 [SMILES: CC(=O)O/N=C(\CCSc1ccc(C)cc1)C(=O)c1ccc(Sc2ccc(C(=O)c3ccccc3)cc2)cc1]

Surfactant S3

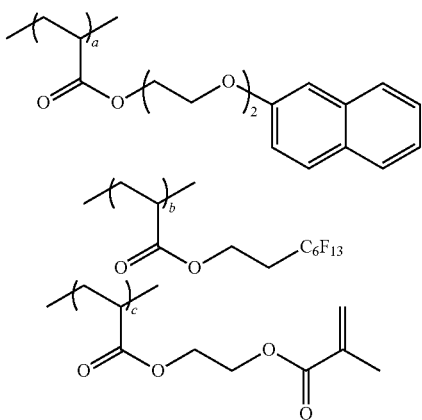

The photo-alignment film-forming coating solution 1 prepared as described above was applied to a single surface of the prepared protective film 3 using a bar coater. After the application, the protective film 3 to which the photo-alignment film-forming coating solution 1 was applied was dried on a hot plate at 120° C. for 2 minutes to remove the solvent. As a result, a coating film was formed. By irradiating the obtained coating film with ultraviolet light (10 mJ/cm$^2$, using an extra high pressure mercury lamp), a photo-alignment film was formed.

Next, the liquid crystal layer-forming composition 1 prepared as described above was applied to the photo-alignment film using a bar coater to form a composition layer. The formed composition layer was temporarily heated up to 110° C. on a hot plate and was cooled to 60° C. to stabilize the alignment. Next, while holding the temperature at 60° C., the composition layer was irradiated with ultraviolet light (500 mJ/cm$^2$, using an extra high pressure mercury lamp) in a nitrogen atmosphere (oxygen concentration: 100 ppm) to immobilize the alignment. As a result, the first optical compensation layer having a thickness of 2 μm was prepared. The in-plane retardation (Re) of the obtained first optical compensation layer was 140 nm, and Re (450)/Re (550) was 0.86.

A corona treatment was performed on a surface to which the first optical compensation layer was applied in a discharge amount of 150 W·min/m$^2$, and a second optical compensation layer was formed on the first optical compensation layer using the same method as described above except that the following liquid crystal layer-forming composition 2 was used. As a result, an optical compensation layer 1 was obtained.

| Liquid crystal layer-forming composition 2 | | |
|---|---|---|
| Liquid crystal compound R1 | ... | 50.0 parts by mass |
| Liquid crystal compound R2 | ... | 33.3 parts by mass |
| Liquid crystal compound R3 | ... | 16.7 parts by mass |
| Compound B1 | ... | 1.5 parts by mass |
| Monomer K1 | ... | 4.0 parts by mass |
| Polymerization initiator P1 | ... | 5.0 parts by mass |
| Polymerization initiator P2 | ... | 2.0 parts by mass |
| Surfactant S1 | ... | 0.4 parts by mass |
| Surfactant S2 | ... | 0.5 parts by mass |
| Acetone | ... | 200.0 parts by mass |
| Propylene glycol monomethyl ether acetate | ... | 50.0 parts by mass |

Liquid Crystal Compound R1

A mixture obtained by mixing the following liquid crystal compound (RA), (RB), and (RC) at 83:15:2 (mass ratio)

(RA)
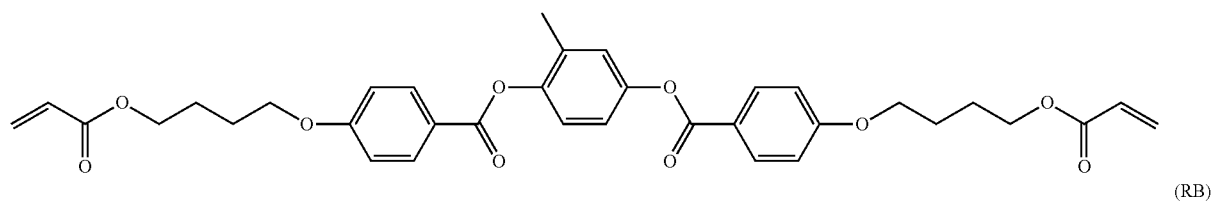
(RB)
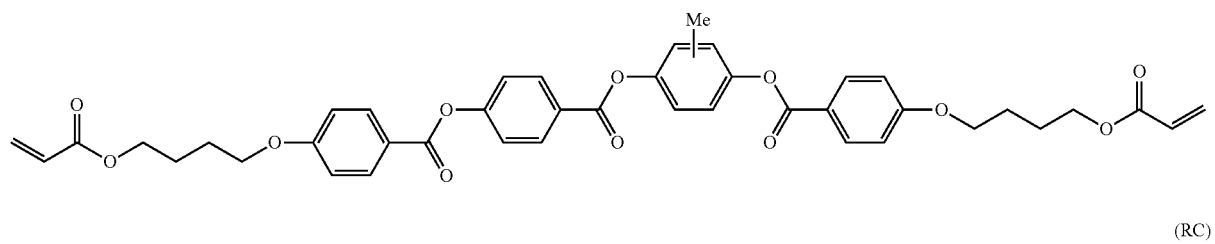
(RC)
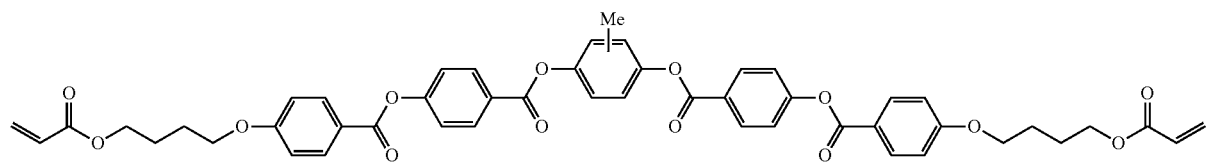
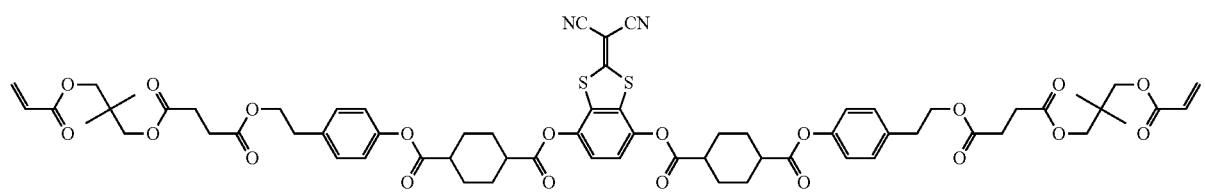
Liquid Crystal Compound R2
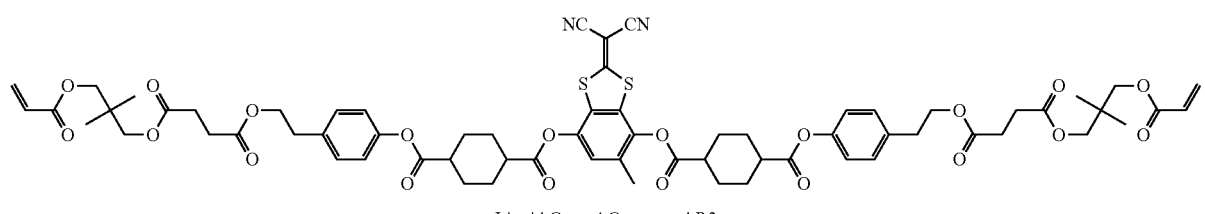
Liquid Crystal Compound R3
Compound B1
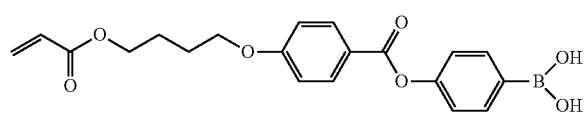
Monomer K1: A-TMMT (Manufactured by Shin-Nakamura Chemical Co., Ltd.)
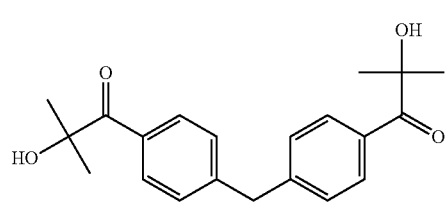
Polymerization initiator P1
-continued
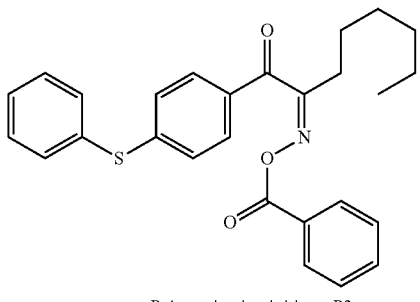
Polymerization initiator P2

-continued

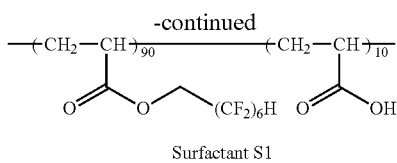

Surfactant S1

Mw: 15 k
Numerical value in Structure is expressed in mass %

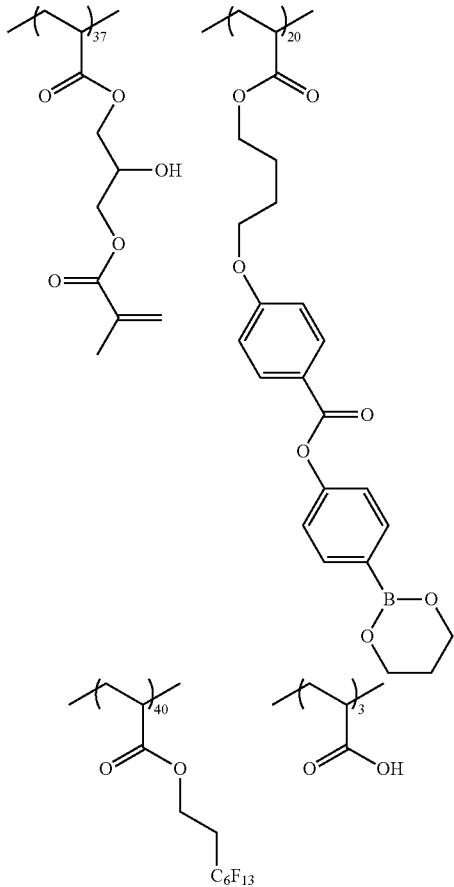

Surfactant S2 (weight-average molecular weight: 11.200)

(Preparation of Polarizing Plate)

The prepared protective film 1 on which the saponification treatment was performed, the polyvinyl alcohol polarizer, and the optical compensation layer 1 were laminated using an adhesive such that the absorption axis of the polarizer and the slow axis of the optical compensation layer 1 were parallel to each other. As a result, an upper polarizing plate according to Example 1 was prepared. At this time, the protective film 1, the polyvinyl alcohol polarizer, and the optical compensation layer 1 were laminated such that the second optical compensation layer side of the optical compensation layer 1 was the polarizer side. As the adhesive, a 3% PVA (manufactured by Kuraray Co., Ltd., PVA-117H) aqueous solution was used. At this time, the polarizer and the optical compensation layer were bonded with sufficient adhesiveness in practice.

In addition, the prepared protective film 1 on which the saponification treatment was performed, the polyvinyl alcohol polarizer, and the prepared protective film 2 on which the saponification treatment was performed were laminated using the same method to prepare a lower polarizing plate.

(Preparation of Liquid Crystal Display Device)

The upper polarizing plate and the lower polarizing plate were laminated on the liquid crystal cell 1 such that the optical compensation layer 1 and the protective film 2 were positioned on the liquid crystal cell side using SK 2057 (manufactured by Soken Chemical&Engineering Co., Ltd.). As a result, a liquid crystal display device according to Example 1 was prepared. At this time, the upper polarizing plate and the lower polarizing plate were laminated such that the slow axis of the liquid crystal compound in the liquid crystal cell and the absorption axis of the upper polarizing plate were perpendicular to each other and the slow axis of the liquid crystal layer in the liquid crystal cell and the absorption axis of the lower polarizing plate were parallel to each other.

Examples 2 to 6

A photo-alignment film-forming material described in Example 1 of WO2016/002722A was prepared, and a first optical compensation layer and a second optical compensation layer were prepared using the same method as that of Example 1, except that the photo-alignment film-forming material was used as the photo-alignment film-forming coating solution and the mixing ratio of the liquid crystal compound and the thickness of the optical compensation layer were changed. The second optical compensation layer side of the prepared optical compensation layer was laminated on the polarizer, and the protective film 3 was released from the polarizing plate. As a result, the polarizing plate to which only the two optical compensation layers were bonded was prepared. A liquid crystal display device according to Example 2 was prepared using the same method as that of Example 1, except that the polarizing plate was used.

Further, liquid crystal display devices according to Examples 3 to 6 were prepared using the same method as that of Example 1, except that the mixing ratio of the liquid crystal compound and the thickness of the optical compensation layer were changed to adjust a phase difference such that the liquid crystal cell was changed.

Example 7

The protective film 1 on which a saponification treatment was performed and the polyvinyl alcohol polarizer were laminated to prepare a lower polarizing plate having a single surface on which the protective film was provided. A liquid crystal display device according to Example 7 was prepared using the same method as that of Example 1, except that a surface of the lower polarizing plate on which the protective film was not provided was laminated on the liquid crystal cell side and the liquid crystal cell and the optical compensation layer shown in Table 1 were used.

Regarding the optical compensation layer, as in Examples 2 to 6, the optical compensation layer having predetermined characteristics was obtained by changing the mixing ratio of the liquid crystal compound and the thickness of the optical compensation layer.

Example 8

A liquid crystal display devices according to Examples 8 were prepared using the same method as that of Example 1, except that the mixing ratio of the liquid crystal compound and the thickness of the optical compensation layer were changed to adjust a phase difference such that the liquid crystal cell was changed.

Example 9

The following compounds were mixed with each other at a ratio described below to prepare an adhesive solution A.

ARONIX M-220 (manufactured by Toagosei Co., Ltd.): 20 parts by mass 4-hydroxybutyl acrylate (manufactured by Nippon Kasei Chemical Co., Ltd.): 40 parts by mass 2-ethylhexyl acrylate (manufactured by Mitsubishi Chemical Corporation): 40 parts by mass IRGACURE 907 (manufactured by BASF SE): 1.5 parts by mass KAYACURE DETX-S (manufactured by Nippon Kayaku Co., Ltd.): 0.5 parts by mass A corona treatment was performed on a surface of the protective film 4 where the polarizer was laminated in a discharge amount of 125 W·min/m², and then the adhesive solution A was applied at a thickness of 0.5 μm. Next, the surface to which the adhesive was applied was laminated on the polarizer surface of the polarizing plate having a single surface on which the protective film was provided prepared in Example 7, and the laminate was irradiated with ultraviolet light from the protective film 4 at 300 mJ/cm² in an air atmosphere at 40° C. Next, the laminate was dried at 60° C. for 3 minutes to prepare a lower polarizing plate. A liquid crystal display device according to Example 9 was prepared using the same method as that of Example 8, except that the protective film 4 side of the lower polarizing plate was laminated on the liquid crystal cell.

Example 10

A liquid crystal display device according to Example 10 was prepared using the same method as that of Example 8, except that the lower polarizing plate prepared in Example 1 was used.

Comparative Example 1

By monoaxially stretching a non-stretched cycloolefin polymer film (manufactured by JSR Corporation, trade name: ARTON film), a cycloolefin polymer (corresponding to the first optical compensation layer in Table 2) having Re=110 nm, Rth=55 nm, and a thickness of 24 μm was prepared.

A corona treatment was performed on a single surface of the polymer film in a discharge amount of 125 W·min/m², and a liquid crystal layer-forming composition 3 having the following composition was applied to the corona-treated surface using a wire bar of #3.0.

Next, in order to dry the solvent in the composition layer and to age the alignment of the liquid crystal compound, the coating film was heated with warm air at 70° C. for 90 seconds. Under a nitrogen purge, the coating film was irradiated with ultraviolet light (300 mJ/cm²) at 40° C. at an oxygen concentration: 0.1% to immobilize the alignment of the liquid crystal compound. As a result, the optical compensation layer (corresponding to the first optical compensation layer in Table 2) was prepared.

| Liquid crystal layer-forming composition 3 | | |
|---|---|---|
| Liquid crystal compound R1: | ... | 100.0 parts by mass |
| Alignment assistant A1 | ... | 2.0 parts by mass |
| Compound B1 | ... | 4.5 parts by mass |
| Monomer K1 | ... | 4.0 parts by mass |
| Polymerization initiator P1 | ... | 5.0 parts by mass |
| Polymerization initiator P2 | ... | 2.0 parts by mass |
| Surfactant S1 | ... | 0.4 parts by mass |
| Surfactant S2 | ... | 0.5 parts by mass |
| Acetone | ... | 386.4 parts by mass |
| Propylene glycol monomethyl ether acetate | ... | 71.0 parts by mass |
| Methanol | ... | 14.2 parts by mass |

Alignment Assistant A1

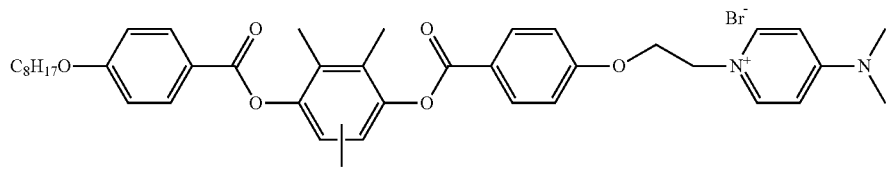

Regarding the prepared optical compensation layer, Re and Rth were measured using the above-described method. The results are shown in Table 2 below.

A liquid crystal display device was prepared using the same method as that of Example 1, except that the optical compensation layer obtained as described above was used and the kind of the liquid crystal cell was changed.

In the upper polarizing plate according to Comparative Example 1, the second optical compensation layer, the first optical compensation layer, and the polarizer were laminated in this order from the liquid crystal cell side, and the absorption axis of the upper polarizer and the slow axis of the optical compensation layer were perpendicular to each other.

Comparative Examples 2 and 4

A liquid crystal display device was prepared using the same method as that of Example 1, except that Re and Rth of the optical compensation layer were changed as shown in Table 2 and a relationship between the absorption axis of the upper polarizer and the slow axis of the optical compensation layer was as shown in Table 2.

Comparative Example 3

A liquid crystal display device was prepared using the same method as that of Example 10, except that the kind of the liquid crystal cell was changed.

<Optical Performance of Liquid Crystal Display Device>

Each of the prepared liquid crystal display devices was disposed on a diffuse light source, and light leak and tint at the time of black display were measured using the following method. The evaluation results are shown in Table 2 below.

The prepared liquid crystal display device was laminated on a diffuse light source such that the lower polarizing plate was positioned on the diffuse light source side, and the brightness and the tint of the black display at the time of black display in a range of an azimuthal angle 0° (horizontal direction) to 359° and a range of a polar angle 0° (front direction) to 88° were measured counterclockwise per 1° using a measuring instrument "EZ-Contrast XL88" (manufactured by ELDIM).

Regarding the evaluation of light leak, a numerical value X (a maximum brightness at a polar angle of 60°/a brightness in the front direction) obtained by dividing the maximum brightness at a polar angle of 60° by the brightness in the front direction was calculated and evaluated using the following method.

In addition, regarding the tint change, the tint at a polar angle of 60° (each tint in a range of an azimuthal angle 0° to 359° when measured counterclockwise per 1° at a polar angle of 60°) was plotted on a u'v' plane, and a numerical value Y as the length of a diagonal line of a rectangle drawn by Δu' and Δv' was calculated and was evaluated using the following standards.

A: the numerical value X was 1.4 or more
B: the numerical value was more than 1.4 and 1.7 or less
C: the numerical value was more than 1.7 and 2.0 or less
D: the numerical value X was more than 2.0
A: the numerical value Y was 0.09 or less
B: the numerical value was more than 0.09 and 0.11 or less
C: the numerical value was more than 0.11 and 0.13 or less
D: the numerical value was more than 0.13

In Table 2, "Facing Side Protective Film" represents Rth (550) of the protective film that is disposed between the liquid crystal cell and the polarizer disposed on the side opposite to the visible side, and "None" represents the corresponding protective film was not provided.

TABLE 2

| | | Optical Compensation Member | | First Optical Compensation Member | | | Second Optical Compensation Member | |
|---|---|---|---|---|---|---|---|---|
| | Liquid Crystal Cell | Re (450)/ Re(550) | Relationship between Absorption Axis of Polarizer and Slow Axis | Re1 (450) (nm) | Re1 (550) (nm) | Ret (450)/ Re1(550) | Rth1 (550) (nm) | Re2 (550) (nm) | Rth2 (450) (nm) |
| Example 1 | Liquid Crystal Cell 4 | 0.86 | Parallel | 120 | 140 | 0.86 | 70 | 0 | −90 |
| Example 2 | Liquid Crystal Cell 1 | 0.92 | Parallel | 120 | 130 | 0.92 | 65 | 0 | −80 |
| Example 3 | Liquid Crystal Cell 3 | 0.77 | Parallel | 100 | 130 | 0.77 | 65 | 0 | −110 |
| Example 4 | Liquid Crystal Cell 4 | 0.86 | Parallel | 120 | 140 | 0.86 | 70 | 0 | −90 |
| Example 5 | Liquid Crystal Cell 2 | 0.86 | Parallel | 120 | 140 | 0.86 | 70 | 0 | −100 |
| Example 6 | Liquid Crystal Cell 5 | 0.83 | Parallel | 100 | 120 | 0.83 | 60 | 0 | −90 |
| Example 7 | Liquid Crystal Cell 4 | 0.86 | Parallel | 120 | 140 | 0.86 | 70 | 0 | −90 |
| Example 8 | Liquid Crystal Cell 7 | 0.92 | Parallel | 120 | 130 | 0.92 | 65 | 0 | −90 |
| Example 9 | Liquid Crystal Cell 7 | 0.92 | Parallel | 120 | 130 | 0.92 | 65 | 0 | −90 |
| Example 10 | Liquid Crystal Cell 7 | 0.92 | Parallel | 120 | 130 | 0.92 | 65 | 0 | −90 |
| Comparative Example 1 | Liquid Crystal Cell | 1.00 | Perpendicular | 110 | 110 | 1.00 | 55 | 0 | −120 |
| Comparative Example 2 | Liquid Crystal Cell | 1.00 | Perpendicular | 130 | 130 | 1.00 | 80 | 0 | −144 |
| Comparative Examule 3 | Liquid Crystal Cell | 0.92 | Parallel | 120 | 130 | 0.92 | 65 | 0 | −90 |
| Comparative Example 4 | Liquid Crystal Cell | 1.00 | Parallel | 110 | 110 | 1.00 | 55 | 0 | −120 |

| | | Second Optical Compensation Member | | Facing Side Protective Film | Color Filter | | | | |
|---|---|---|---|---|---|---|---|---|---|
| | | Rth2 (550) (nm) | Rth2(450)/ Rth2(550) | Rth3 (550) (nm) | Rth (λ₁) (nm) | Rth (λ₁₂) (nm) | Rth (λ₃) (nm) | Light Leak in Oblique Direction | Tint |
| | Example 1 | −100 | 0.90 | −5 | 0 | 0 | 10 | A | A |
| | Example 2 | −90 | 0.89 | −5 | 0 | 7 | 25 | B | A |
| | Example 3 | −120 | 0.92 | −5 | 7 | 0 | 15 | B | C |
| | Example 4 | −100 | 0.90 | −5 | 0 | 0 | 10 | A | A |
| | Example 5 | −110 | 0.91 | −5 | 0 | 0 | 0 | A | A |
| | Example 6 | −100 | 0.90 | −5 | 3 | 0 | 10 | B | B |
| | Example 7 | −100 | 0.90 | None | 0 | 0 | 10 | A | A |
| | Example 8 | −100 | 0.90 | None | 0 | 0 | 10 | A | C |
| | Example 9 | −100 | 0.90 | −2 | 0 | 0 | 10 | A | B |
| | Example 10 | −100 | 0.90 | −5 | 0 | 0 | 10 | A | A |
| | Comparative Example 1 | −100 | 1.20 | −5 | 0 | 7 | 25 | D | B |
| | Comparative Example 2 | −120 | 1.20 | −5 | 0 | 7 | 25 | D | B |
| | Comparative Examule 3 | −100 | 0.90 | −5 | 17 | 7 | 0 | C | D |
| | Comparative Example 4 | −100 | 1.20 | −5 | 0 | 0 | 10 | C | D |

As shown in Table 2, it was found that, with the liquid crystal display device according to the present invention, the desired effect can be obtained.

In particular, the following was found from a comparison between Examples 1 to 6: it is more preferable that a requirement of Expression (5) is satisfied; and it is more preferable that a requirement of Expression (5-1) is satisfied.

In addition, it was found from a comparison between Examples 8 to 10 that, in a case where Rth (550) of the rear substrate of the liquid crystal cell is not 0, it is preferable that the value of Rth3 (550) of the protective film satisfies Expression (13)

In the aspects of Examples 1 to 10, in a case where the polarizer and the optical compensation layer are bonded to each other using a method described below, excellent adhesiveness can be obtained, and the same display performance as that in a case where the polarizer and the optical compensation layer are bonded to each other using the above-described PVA 3% aqueous solution can be obtained.

A corona treatment was performed on a surface of the optical compensation layer where the polarizer was laminated in a discharge amount of 125 W·min/m², and then the adhesive solution A prepared in Example 9 was applied at a thickness of 0.5 μm. Next, the surface to which the adhesive was applied was laminated on the polarizer and was irradiated with ultraviolet light from the optical compensation layer side at 300 mJ/cm² in an air atmosphere at 40° C. Next, the surface to which the adhesive was applied was dried at 60° C. for 3 minutes.

EXPLANATION OF REFERENCES

1: upper protective film
2: polarizer
3: absorption axis of polarizer
4: second optical compensation layer
5: first optical compensation layer
6: in-plane slow axis of first optical compensation layer
7: liquid crystal cell upper substrate
8: liquid crystal compound (liquid crystal layer)
9: liquid crystal cell lower substrate
10: protective film
11: polarizer
12: absorption axis of polarizer
13: protective film
14: backlight unit
15: optical compensation layer
16: upper polarizing plate
17: lower polarizing plate

What is claimed is:

1. A liquid crystal display device comprising at least:
a liquid crystal cell that includes a pair of substrates and a liquid crystal layer and in which an electric field including a component that is parallel to at least one of the substrates including an electrode is formed by the electrode, the pair of substrates being disposed to face each other, and the liquid crystal layer being disposed between the pair of substrates and including a liquid crystal compound with controlled alignment; and
a pair of polarizing plates that are disposed such that the liquid crystal cell is interposed between the pair of polarizing plates,
wherein a tilt angle of the liquid crystal compound is 1.0° or less,
the liquid crystal cell includes at least a first pixel region, a second pixel region, and a third pixel region,
a first color filter that is disposed on the first pixel region of the liquid crystal cell, a second color filter that is disposed on the second pixel region of the liquid crystal cell, and a third color filter that is disposed on the third pixel region of the liquid crystal cell are disposed between the pair of polarizing plates on a visible side further than the liquid crystal cell,
in a case where a wavelength representing a maximum transmittance of the first color filter is represented by $\lambda_1$, a wavelength representing a maximum transmittance of the second color filter is represented by $\lambda_2$, and a wavelength representing a maximum transmittance of the third color filter is represented by $\lambda_3$, a relationship of $\lambda_1 < \lambda_2 < \lambda_3$ is satisfied,
a thickness-direction retardation Rth ($\lambda_1$) at the wavelength $\lambda_1$ of the first color filter, a thickness-direction retardation Rth ($\lambda_2$) at the wavelength $\lambda_2$ of the second color filter, and a thickness-direction retardation Rth ($\lambda_3$) at the wavelength $\lambda_3$ of the third color filter satisfy requirements of Expressions (1) to (3), $Rth(\lambda_1) \leq Rth(\lambda_3)$,      Expression (1):

$Rth(\lambda_2) \leq Rth(\lambda_3)$, and      Expression (2):

$Rth(\lambda_2) \leq 25$ nm,      Expression (3):

the polarizing plate that is disposed on the visible side among the pair of polarizing plates includes an optical compensation layer and a polarizer in this order from the liquid crystal cell side,
an in-plane slow axis of the optical compensation layer and an absorption axis of the polarizer are parallel to each other, and
an in-plane retardation Re (450) of the optical compensation layer at a wavelength of 450 nm and an in-plane retardation Re (550) of the optical compensation layer at a wavelength of 550 nm satisfy a requirement of Expression (4), $Re(450)/Re(550) < 0.95$.      Expression (4):

2. The liquid crystal display device according to claim 1, wherein a requirement of Expression (5) is satisfied, $(Rth(\lambda_1) - 5 \text{ nm}) \leq Rth(\lambda_2)$.      Expression (5):

3. The liquid crystal display device according to claim 2, wherein a requirement of Expression (5-1) is satisfied, $Rth(\lambda_1) \leq Rth(\lambda_2)$.      Expression (5-1):

4. The liquid crystal display device according to claim 2, wherein the optical compensation layer includes a first optical compensation layer and a second optical compensation layer in this order from the liquid crystal cell side,
an in-plane retardation Re1 (550) of the first optical compensation layer at a wavelength of 550 nm and a thickness-direction retardation Rth1 (550) of the first optical compensation layer at a wavelength of 550 nm satisfy requirements of Expressions (8) and (9), 80 nm $\leq Re1(550) \leq$ 200 nm, and      Expression (8):

20 nm $\leq Rth1(550) \leq$ 150 nm, and      Expression (9):

an in-plane retardation Re2 (550) of the second optical compensation layer at a wavelength of 550 nm and a thickness-direction retardation Rth2 (550) of the second optical compensation layer at a wavelength of 550 nm satisfy requirements of Expressions (10) and (11), 0 nm $\leq Re2(550) \leq$ 40 nm, and      Expression (10):

$-160$ nm $\leq Rth2(550) \leq -40$ nm.      Expression (11):

5. The liquid crystal display device according to claim 1, wherein a requirement of Expression (5-1) is satisfied, $$Rth(\lambda_1) \leq Rth(\lambda_2).$$ Expression (5-1):

6. The liquid crystal display device according to claim 5, wherein the optical compensation layer includes a first optical compensation layer and a second optical compensation layer in this order from the liquid crystal cell side,
an in-plane retardation Re1 (550) of the first optical compensation layer at a wavelength of 550 nm and a thickness-direction retardation Rth1 (550) of the first optical compensation layer at a wavelength of 550 nm satisfy requirements of Expressions (8) and (9), $$80 \text{ nm} \leq Re1(550) \leq 200 \text{ nm, and}$$ Expression (8):

$$20 \text{ nm} \leq Rth1(550) \leq 150 \text{ nm, and}$$ Expression (9):

an in-plane retardation Re2 (550) of the second optical compensation layer at a wavelength of 550 nm and a thickness-direction retardation Rth2 (550) of the second optical compensation layer at a wavelength of 550 nm satisfy requirements of Expressions (10) and (11), $$0 \text{ nm} \leq Re2(550) \leq 40 \text{ nm, and}$$ Expression (10):

$$-160 \text{ nm} \leq Rth2(550) \leq -40 \text{ nm}.$$ Expression (11):

7. The liquid crystal display device according to claim 1, wherein the optical compensation layer includes a first optical compensation layer and a second optical compensation layer in this order from the liquid crystal cell side,
an in-plane retardation Re1 (550) of the first optical compensation layer at a wavelength of 550 nm and a thickness-direction retardation Rth1 (550) of the first optical compensation layer at a wavelength of 550 nm satisfy requirements of Expressions (8) and (9), $$80 \text{ nm} \leq Re1(550) \leq 200 \text{ nm, and}$$ Expression (8):

$$20 \text{ nm} \leq Rth1(550) \leq 150 \text{ nm, and}$$ Expression (9):

an in-plane retardation Re2 (550) of the second optical compensation layer at a wavelength of 550 nm and a thickness-direction retardation Rth2 (550) of the second optical compensation layer at a wavelength of 550 nm satisfy requirements of Expressions (10) and (11), $$0 \text{ nm} \leq Re2(550) \leq 40 \text{ nm, and}$$ Expression (10):

$$-160 \text{ nm} \leq Rth2(550) \leq -40 \text{ nm}.$$ Expression (11):

8. The liquid crystal display device according to claim 7, wherein the first optical compensation layer is a positive A plate, and
the second optical compensation layer is a positive C plate.

9. The liquid crystal display device according to claim 8, wherein a thickness-direction retardation Rth2 (450) of the second optical compensation layer at a wavelength of 450 nm and a thickness-direction retardation Rth2 (550) of the second optical compensation layer at a wavelength of 550 nm satisfy a requirement of Expression (12), $$Rth2(450)/Rth2(550) < 0.95.$$ Expression (12):

10. The liquid crystal display device according to claim 8, wherein the first optical compensation layer is a λ/4 layer.

11. The liquid crystal display device according to claim 10, wherein a thickness-direction retardation Rth2 (450) of the second optical compensation layer at a wavelength of 450 nm and a thickness-direction retardation Rth2 (550) of the second optical compensation layer at a wavelength of 550 nm satisfy a requirement of Expression (12), $$Rth2(450)/Rth2(550) < 0.95.$$ Expression (12):

12. The liquid crystal display device according to claim 7, wherein a thickness-direction retardation Rth2 (450) of the second optical compensation layer at a wavelength of 450 nm and a thickness-direction retardation Rth2 (550) of the second optical compensation layer at a wavelength of 550 nm satisfy a requirement of Expression (12), $$Rth2(450)/Rth2(550) < 0.95.$$ Expression (12):

13. The liquid crystal display device according to claim 7, wherein at least one of the first optical compensation layer or the second optical compensation layer is a film obtained by immobilizing a liquid crystal compound that is aligned.

14. The liquid crystal display device according to claim 13, wherein the first optical compensation layer is a film obtained by immobilizing a rod-like liquid crystal compound that is aligned in a direction parallel to a substrate surface.

15. The liquid crystal display device according to claim 13, wherein the second optical compensation layer is a film obtained by immobilizing a rod-like liquid crystal compound that is aligned in a direction perpendicular to a substrate surface.

16. The liquid crystal display device according to claim 1, wherein the optical compensation layer has a single-layer configuration, and
an in-plane retardation Re1 (550) of the optical compensation layer at a wavelength of 550 nm and a thickness-direction retardation Rth1 (550) of the optical compensation layer at a wavelength of 550 nm satisfy requirements of Expressions (6) and (7), $$200 \text{ nm} \leq Re1(550) \leq 320 \text{ nm, and}$$ Expression (6):

$$-40 \text{ nm} \leq Rth1(550) \leq 40 \text{ nm}.$$ Expression (7):

17. The liquid crystal display device according to claim 1, wherein the optical compensation layer is bonded to the polarizer through a polyvinyl alcohol adhesive.

18. The liquid crystal display device according to claim 1, wherein the optical compensation layer is directly bonded to the polarizer through a curable adhesive composition that is cured by irradiation of an active energy ray or by heating.

19. The liquid crystal display device according to claim 1, wherein the polarizing plate that is disposed on a side opposite to the visible side among the pair of polarizing plates includes at least a protective film and a polarizer in this order from the liquid crystal cell side.

20. The liquid crystal display device according to claim 19,
wherein a thickness-direction retardation Rth3 (550) of the protective film at a wavelength of 550 nm satisfies a requirement of Expression (13), $$Rth3(550) \leq 0 \text{ nm.} \qquad \text{Expression (13):}$$

* * * * *